(12) United States Patent
Feistel

(10) Patent No.: US 6,367,808 B1
(45) Date of Patent: Apr. 9, 2002

(54) SEALING RING FOR A DRY RUNNING PISTON ROD

(75) Inventor: Norbert Feistel, Winterthur (CH)

(73) Assignee: Maschinenfabrik Sulzer-Burckhardt AG, Basel (CH)

( * ) Notice: Subject to any disclaimer, the term of this patent is extended or adjusted under 35 U.S.C. 154(b) by 0 days.

(21) Appl. No.: 08/973,996

(22) PCT Filed: Jun. 4, 1996

(86) PCT No.: PCT/CH96/00214

§ 371 Date: Dec. 12, 1997

§ 102(e) Date: Dec. 12, 1997

(87) PCT Pub. No.: WO97/00395

PCT Pub. Date: Jan. 3, 1997

(30) Foreign Application Priority Data

Jun. 14, 1995 (EP) .............................................. 95810400

(51) Int. Cl.[7] .................................................. F16J 9/12
(52) U.S. Cl. ........................ 277/490; 277/459; 277/946
(58) Field of Search ................................ 277/447, 448, 277/465, 467, 491, 589, 490, 489, FOR 200, FOR 226, 458, 459, 946

(56) References Cited

U.S. PATENT DOCUMENTS

| 1,250,431 A | * | 12/1917 | Charter ........................ 277/490 |
| 2,036,721 A | | 4/1936 | Roberts ........................ 277/454 |
| 2,589,106 A | * | 3/1952 | Marien ........................ 277/458 |
| 3,554,568 A | * | 1/1971 | Heid, Jr. ................. 277/459 X |
| 3,921,988 A | * | 11/1975 | Prasse et al. ........... 277/459 X |
| 3,926,166 A | * | 12/1975 | Packard .................. 277/459 X |
| 3,942,806 A | * | 3/1976 | Edlund ........................ 277/589 |
| 4,681,326 A | * | 7/1987 | Kubo ........................... 277/447 |
| 4,785,922 A | * | 11/1988 | Kiehart .................... 277/459 X |
| 6,045,135 A | * | 4/2000 | Feistel .................... 277/490 X |

FOREIGN PATENT DOCUMENTS

| CH | 186907 | | 12/1936 | |
| DE | 7318583 | | 7/1975 | |
| DE | 253 283 | * | 1/1988 | ........ 277/FOR 200 |
| FR | 2.108.390 | | 5/1972 | |
| FR | 2 699 600 | * | 6/1994 | ........ 277/FOR 226 |
| GB | 912440 | * | 12/1962 | ................. 277/459 |

* cited by examiner

*Primary Examiner*—Lynne H. Browne
*Assistant Examiner*—Greg Binda
(74) *Attorney, Agent, or Firm*—Towsend and Townsend and Crew LLP

(57) ABSTRACT

A sealing ring, in particular for a piston rod with a circular cross-section, which has a height in the axial direction as well as a surface oriented towards a sliding surface, with the surface being executed to extend cylindrically over a part of the height in order to form a sealing surface and being executed to become wider along a further part. The sealing ring has a high sealing action in the axial direction so that a majority of the gas flows out between the piston rod and the sealing surface so that a gas storage arises.

9 Claims, 5 Drawing Sheets

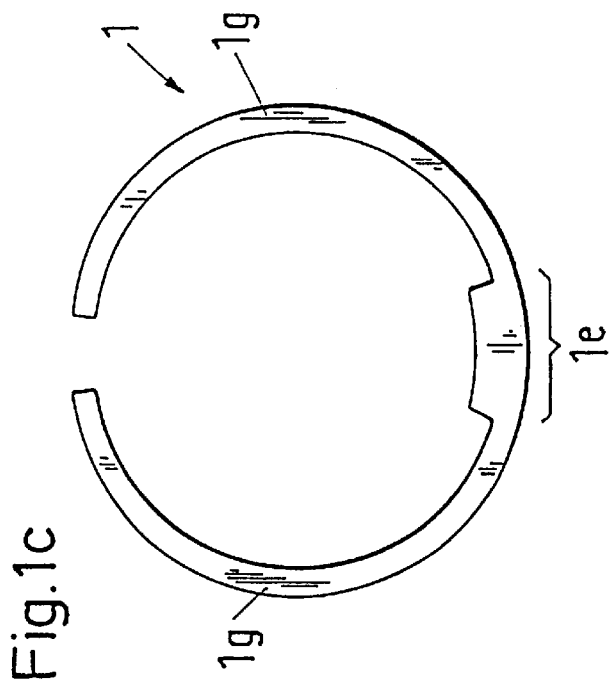
Fig.1c
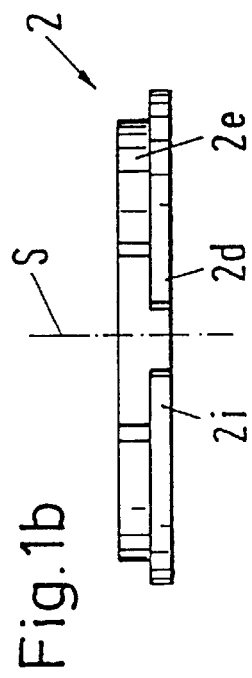
Fig.1d
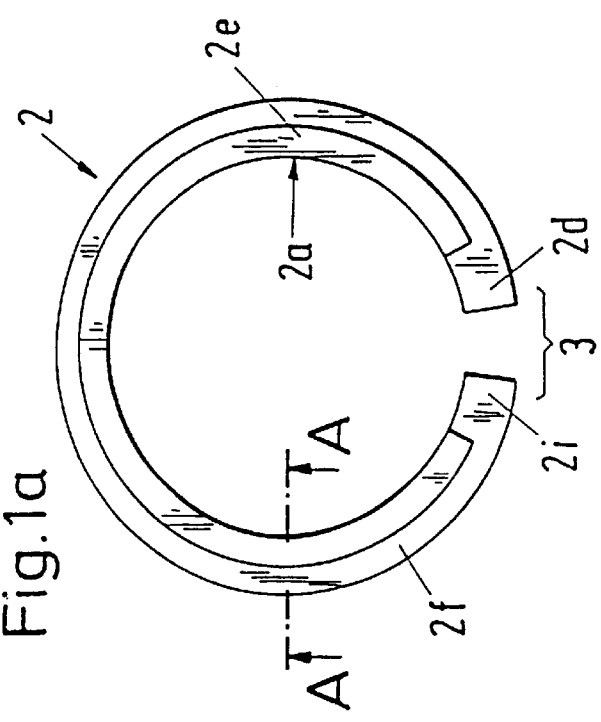
Fig.1a
Fig.1b

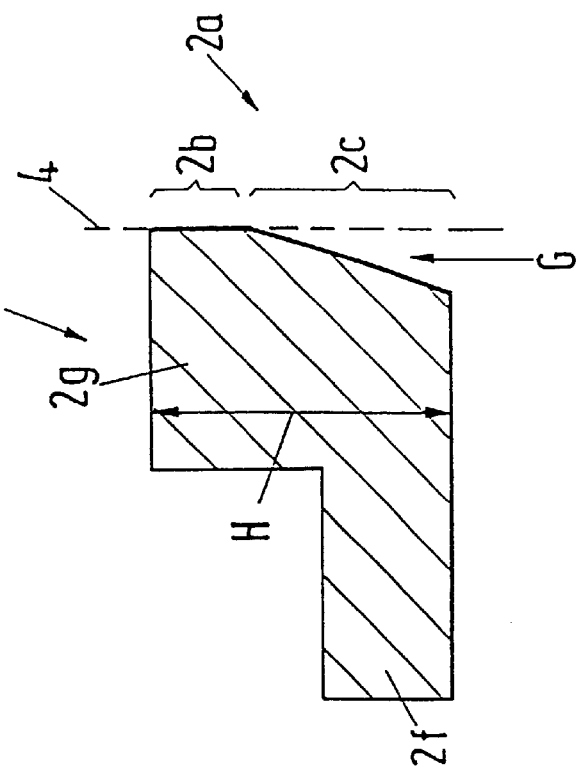
Fig. 1g (A-A)
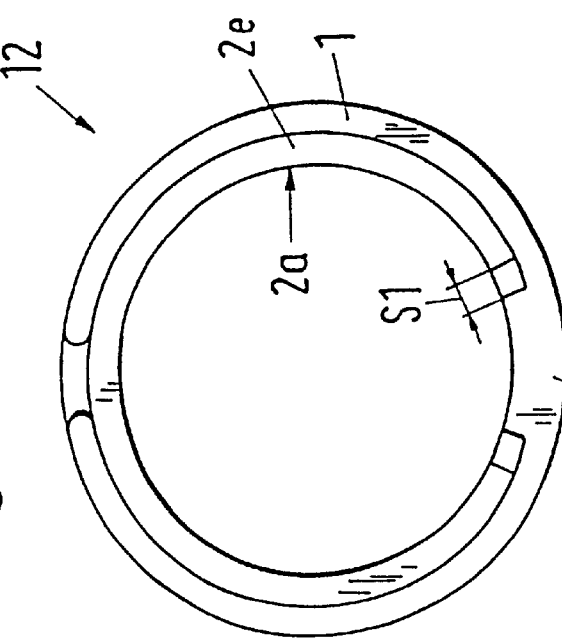
Fig. 1e
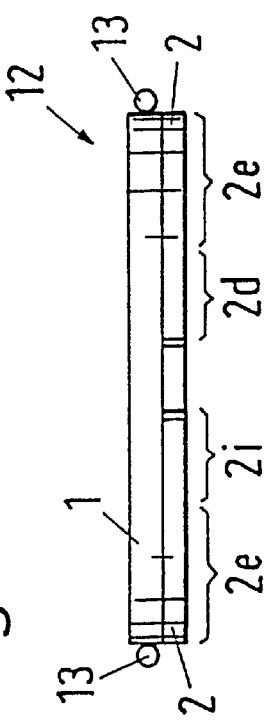
Fig. 1f

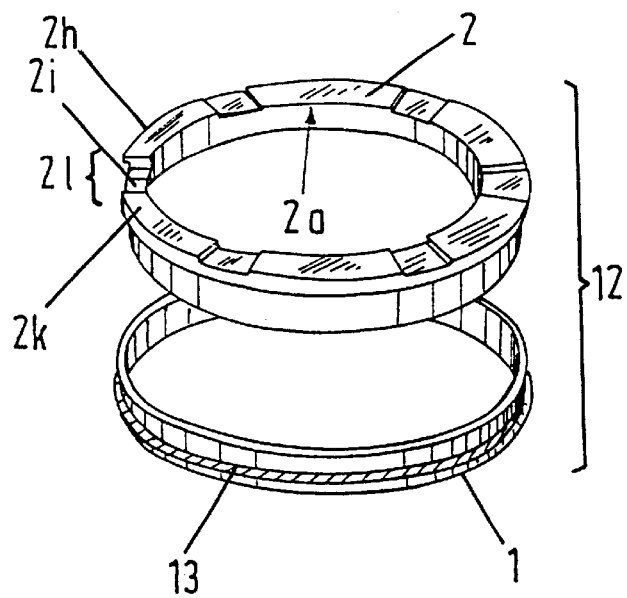
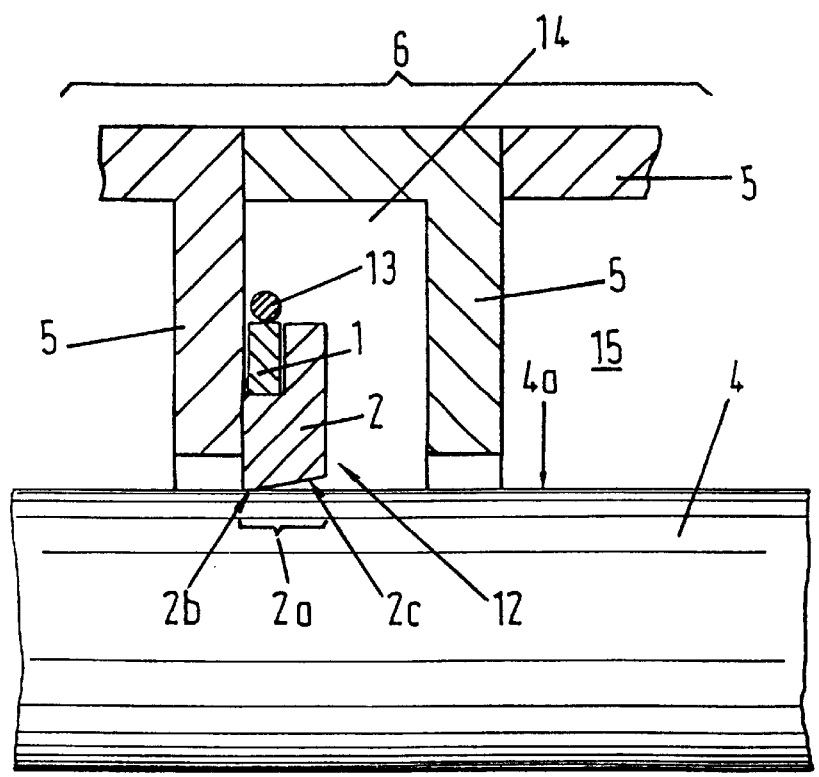

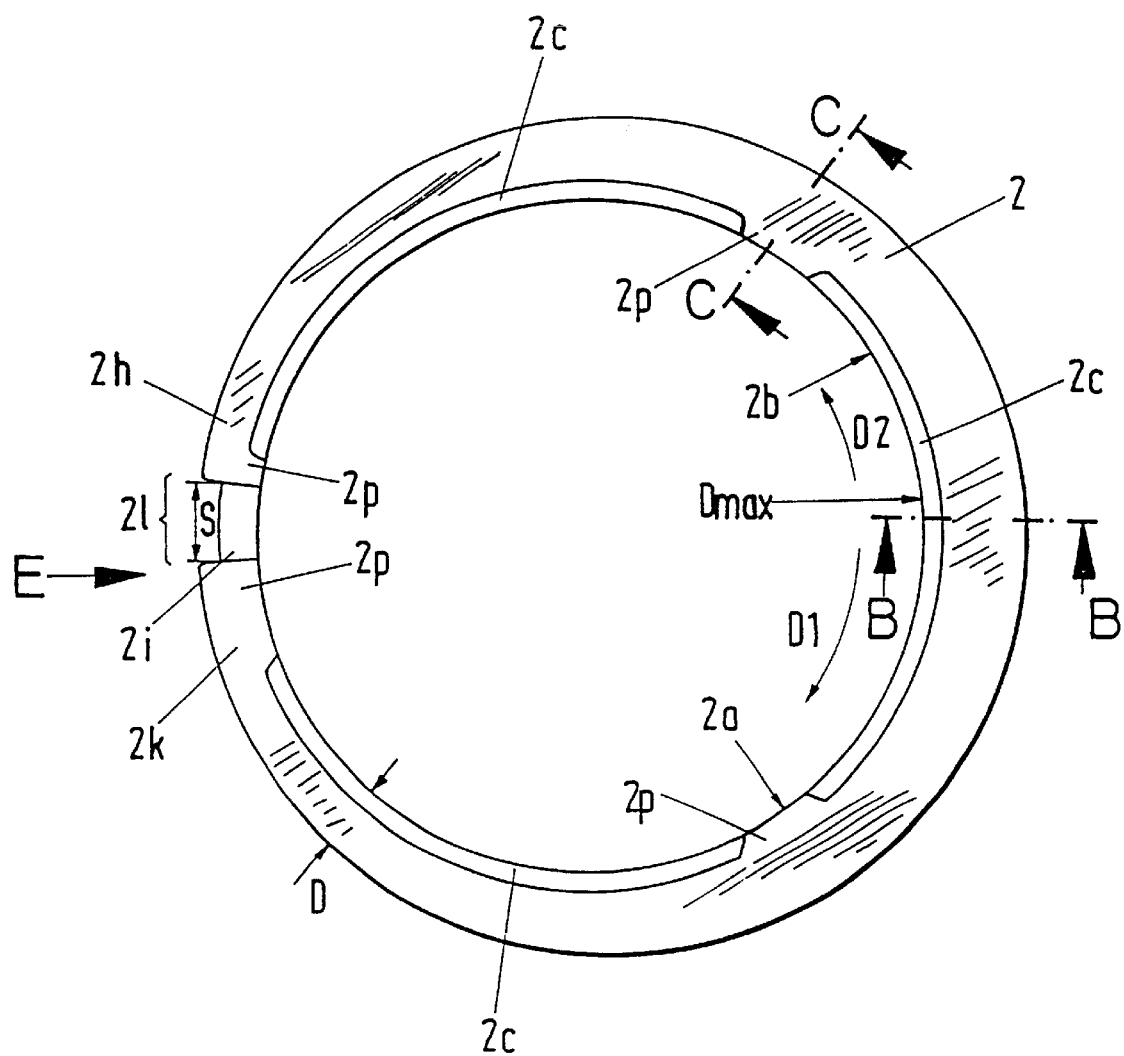

Fig.4a(B-B)
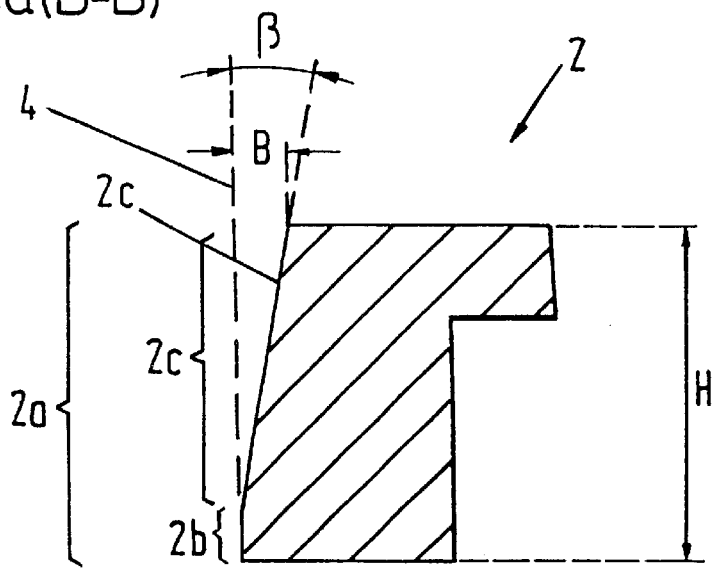
Fig.4b(C-C)
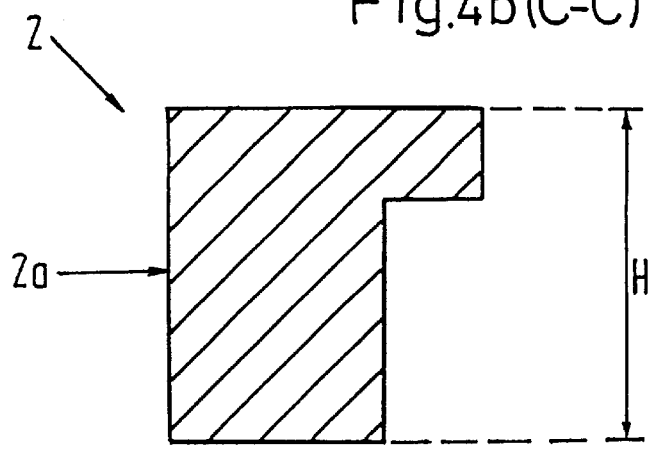
Fig.4c
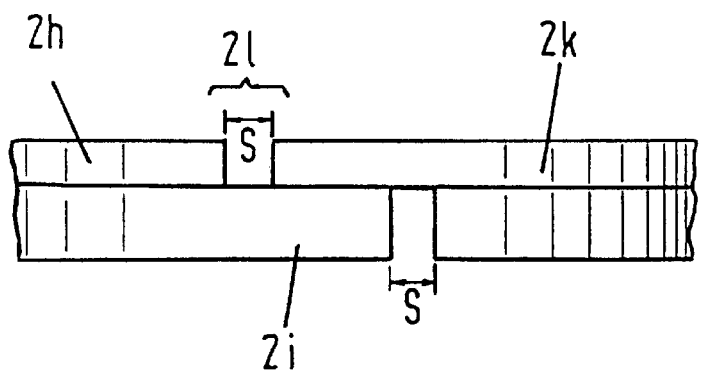

SEALING RING FOR A DRY RUNNING PISTON ROD

BACKGROUND OF THE INVENTION

1. Field of the Invention

The invention relates to a sealing ring for a dry running piston rod.

2. Description of the Prior Art

Sealing rings are usually arranged pairwise one behind the other in series and form in this manner a so-called packing. The pressure difference acting on the individual sealing rings causes their sealing surfaces to be pressed onto the sliding surfaces of the body to be sealed, for instance, a piston rod. Such sealing rings are known, for example, from the patent CH 439 897. These known sealing rings have the disadvantage that the sealing surfaces pressed against the sliding surface cause a strong heat of friction, which leads to overheating and rapid wear. This is true, in particular, for the use of sealing rings in dry running piston compressors which manage in the compression part without any foreign lubrication. Compressors of this type have fixed sealing rings past which a piston rod is moved.

SUMMARY OF THE INVENTION

The object of the present invention is to propose a sealing ring suitable for dry running apparatuses and having an improved sealing behavior.

The sealing ring in accordance with the invention has a height H in the axial direction as well as a surface oriented towards the dry running sliding surface of the body to be sealed off, which is executed in such a manner that it extends parallel to the sliding surface over a portion of the height H and thus forms a sealing surface. The remaining portion of the height H of the sealing ring is spaced from the sliding surface.

In an advantageous embodiment of the sealing ring in accordance with the invention, the remaining portion of the height H of the sealing ring, which does not lie in contact with the sliding surface, is made conically divergent.

The sealing ring is to be arranged in a dry running piston compressor, in particular, with respect to the piston rid in such a manner that the conically divergent region is oriented towards the cylinder space and diverges in the direction towards the cylinder space. A sealing ring of this type has the advantage that the sealing surface of the sealing ring lying in contact with the piston rod is relatively small, which results in reduced friction. A further advantage of the embodiment of the surface in accordance with the invention is to be seen in the fact that through its shape in combination with the reduced sealing surface the gas attempts to flow between the sealing surface and the piston rid so that a gas bearing arises between the sealing surface and the piston rod. Such a gas bearing has the advantage that the friction between the piston rod and the sealing surface is further reduced.

A sealing ring of this kind in accordance with the invention can, in particular, be advantageously used when the fixed seal elements have a high sealing action in the axial direction so that a gas bearing arises, because a large part of the gas flows out between the piston rod and the sealing surface.

The design of the surface oriented towards the sliding surface in the axial direction can be realized in a number of embodiments in such a manner that the surface of a first partial region has a surface extending parallel to the sliding surface and a second partial region has a surface spaced from the sliding surface.

The sealing ring in accordance with the invention is suitable, in particular, for sealing dry running piston compressors operating under very high pressure.

BRIEF DESCRIPTION OF THE DRAWINGS

FIG. 1a is a plan view of a ring-shaped seal part;

FIG. 1b is a side view of the seal part of FIG. 1a;

FIG. 1c is a plan view of a closure part;

FIG. 1d is a side view of the closure part of FIG. 1c;

FIG. 1e is a plan view of an assembled sealing ring;

FIG. 1f is a side view of the assembled sealing ring of FIG. 1e;

FIG. 1g is a section through the seal part of FIG. 1a along the line A—A;

FIG. 2 is a perspective view of a further embodiment of a sealing ring;

FIG. 3 is a longitudinal section through a dry running sealing arrangement;

FIG. 4 is a plan view of the sealing ring of FIG. 2;

FIG. 4a is a cross-section through the sealing ring along the line (B—B);

FIG. 4b is a further cross-section through the sealing ring along the line (C—C);

FIG. 4c is a side view of the sealing ring from the direction (E).

DETAILED DESCRIPTION OF THE PREFERRED EXEMPLARY EMBODIMENTS

FIG. 1a shows a ring-shaped seal part 2 which has a sector-like cut-out 3 so that the seal part 2 has an opening at this position. The seal part 2 has a sealing surface 2a which is oriented towards the piston rod. FIG. 1g shows a section along the line A—A and shows the L-shaped cross-section which the seal part 2 has in the present embodiment. The surface 2a has a height H, with a part 2b of the surface 2a being of cylindrical shape, contacting the piston rod 4, which is shown as a broken line, and forming a contact surface 2b. The contact surface 2b is at least 1 mm thick in the axial direction. A further part 2c of the surface 2a diverges conically from the surface of the piston rod 4. The gas (G) flowing up from the side of the cylinder enters between the conically diverging surface 2c and the piston rod 4 and flows on through between the contact surface 2b and the piston rod 4. In this manner, a gas bearing arises between these two surfaces, which substantially reduces the friction.

The entire sealing ring 12 has an elastic behavior and is advantageously surrounded by a hose spring 13 lying in the groove 1a, so that the sealing ring 12 lies under an elastic biasing stress against the piston rod 4. The gas flowing through between the contact surface 2b and the piston rod 4 exerts a force opposite to the action of the hose spring. The gas flowing through between the contact surface 2b and the piston rod 4 thus effects a reduction of the force pressing the sealing element against the piston rod 4.

The seal part 2 has a main part 2e which runs out at both ends into end parts 2d. From the side view of FIG. 1b, it is evident that the two end parts 2d are made thinner in the direction of a normal S to the plane spanned by the seal part 2, or in the direction of motion of the piston rod 4, than the main part 2e. FIG. 1c shows a closure part 1 which has a main part 1e as well as end parts 1g which adjoin it at both ends and are of ring shape. FIG. 1d shows a side view of the illustration in FIG. 1c of the closure part 1, with the closure part having a groove 1a in the peripheral direction for receiving a hose spring 13. Both the seal part 2 and also the closure part 1 have resilient properties. FIG. 1e shows a sealing ring 12 assembled from the closure part 1 and the seal part 2. In the process, the closure part 1 is placed onto the seal part 2 in such a manner that the closure part 1 lies on the lower part 2f of the seal part 2 and that the closure part 1 surrounds the upper part 2e of the seal part 2 in the form of a ring. The main part 1e covers the cut-out 3 of the seal part 2 and lies in contact with the end parts 2d in the direction of the normal S. The main part 1e can have a profile as shown in FIG. 1g on the surface facing the piston rod 4. The sealing ring 12 thereby has a seal function over the entire jacket surface of the piston rod 4. The main part 1e as well as the seal part 2 have a clearance S1 in the peripheral direction of the seal part 2. The sealing ring 12 is advantageously surrounded by a hose spring 13 so that the sealing ring disk stands under prestress. During the use of the sealing ring 12 as a seal element, the 15 movement of the piston rod leads to wear of the sealing surface 2a, which results in the removal of material. The hose spring 13, the clearance S1, as well as the resilient properties of the sealing ring disk ensure that the sealing surface 2a can continue to lie in contact with the surface of the piston rod 4. FIG. 1f shows a side view of the sealing ring 12 of FIG. 1e.

FIG. 2 shows an exploded view of a further sealing ring 12 consisting of a sealing part 2, a cover ring 1 which can be placed over it in the peripheral direction of the sealing ring 2, as well as a hose spring 13 surrounding the cover ring 1 in the peripheral direction. The cover ring 1 seals off the ring gap 2l in the radial as well as in the axial direction.

The plan view of the sealing ring 2 shown in FIG. 4 has a surface 2a, 2b which extends circularly along the inner circle and faces the piston rod 4 and performs a sealing function. The sealing part 2 is executed as a single piece ring with a parting joint 2l so that the sealing part 2 runs out into two ends 2h, 2k. The end 2k is executed in such a manner that it has a section 2i which extends in the peripheral direction of the sealing part 2 and, together with the other end 2h, forms an overlapping ring gap in the peripheral direction. The sealing part 2 has elastic properties so that it has a clearance C in the region of the parting joint 2l. In the preceding exemplary embodiment, the sealing part 2 is executed in such a manner that its radial wall thickness D, beginning at the position Dmax opposite to the parting joint 2l, continually decreases towards the parting joint 2l, which means in the direction D1 or D2. As a result, even a sealing part manufactured of a material with a high modulus of elasticity, such as a high temperature polymer, for example, has a behavior towards the parting joint 2l which is increasingly elastic and/or soft in bending.

FIG. 3 shows a longitudinal section through a dry running sealing arrangement or a so-called packing 6. To this belongs at least one sealing chamber 14 surrounding the piston rod 4, which is formed of two chamber rings 5 and which are screwed sealingly together to form the associated cylinder space 15. A two-part sealing 10 ring 12 is placed in the sealing chamber 14 and comprises a sealing part 2 as well as a cover ring 1. In addition, a hose spring 13 surrounds the cover ring 1. The sealing surface 2a has a surface 2c diverging in wedge shape towards the compression space 15.

The sealing part 2 of FIG. 4 has a sealing surface 2a with a conically diverging partial surface 2c. The partial surface 2c is interrupted at three places by a web 2p. FIG. 4a shows a section through the sealing part 2 along the line B—B and shows the cone-shaped partial surface 2c which extends in the axial direction, as well as the cylindrically extending partial surface 2b which produces the sealing action between the sealing part 2 and the piston rod 4. The partial surface 2c extending in a cone shape intersects the surface of the piston rod 4 at an angle β. FIG. 4b shows a section through a web 2p of the sealing part 2 along the line C—C. A web 2p is executed in such a manner that the sealing surface 2a has a height in the axial direction corresponding to the height H of the sealing part 2 and extends parallel to the surface of the shaft 4. A web 2p lies in contact with the piston rod 4 over the entire height H and serves to stabilize the sealing part 2. The exemplary embodiment shown has three webs 2p arranged to be distributed over the periphery of the surface 2a, with a web 2p being placed in the region of the parting joint 2l. A sealing part 2 can naturally also be executed without a web 2p so that the conically diverging partial surface 2c extends over the entire periphery of the surface 2a without interruption.

The conically diverging partial surface 2c has a maximum distance B from the shaft 4 in accordance with FIG. 4a. In one embodiment of the sealing part 2, the clearance C is made so wide that it has a width of the product of twice the value of π times the distance B. A sealing ring 12 with a seating part 2 executed in this manner forms a friction ring in a first phase of operation and a flow ring in a second phase of operation. In the first phase of operation, the sealing part 2 has a conically diverging partial surface 2c. With increasing wear at the contact surface 2b, the conically diverging partial surface 2c is diminished until the contact surface 2b extends over the entire height H. If now the clearance C is made to correspond to a width of the product of twice the value of π times the distance B, the clearance becomes zero as soon as the partial surface 2c is completely abraded away. In this state, the sealing part 2 becomes a flow ring because, since the play amounts to zero, hardly any further wear of the contact surface 2b results so that the sealing part 2 has an approximately constant leakage during the second phase of operation, or the sealing part 2 has a maximum flow resistance which remains approximately constant during the second phase of operation.

FIG. 4c shows a side view of the sealing ring of FIG. 4 from the direction E indicated in FIG. 4. The gap position of the sealing part 2 has the two ends 2h, 2k, with the end 2h having the end section 2i which extends in the peripheral direction, so that an overlapping ring gap in the peripheral direction results with a parting joint 21 or a clearance C respectively.

The partial surface 2c need not be executed to extend diverge conically, but can take on any arbitrary shape in such a manner that a spacing arises in the region of the partial surface 2c between the shaft 4 and the sealing part 2.

A web 2p is advantageously placed at each end part 2k, 2h, at the ring gap 2l in order to achieve a good sealing action of the sealing ring. A plurality of webs 2p can be distributed along the surface 2a in the peripheral direction, for example, 2, 4, 7, 12, or 24 webs 2p. The webs 2p can be made very narrow in the peripheral direction so that with respect to the peripheral direction the distance between two webs 2p is greater or many times greater than the width of the web 2p. The webs 2p can be executed with a constant width or else have differing widths.

The sealing part 2 can be made of a plastic such as polytetrafluoroethylene (PTFE) or of a modified high-temperature polymer such as poly(ether ether ketone) (PEEK), poly(ether keytone) (PEK), polyimide (PI), poly(phenylene sulphide) (PPS), polybenzimidazole (PBI), or polyamideimide (PAI).

What is claimed is:

1. A dry running sealing ring for a dry running piston rod with a circular cross-section, wherein the sealing ring is manufactured from a non-metallic material and has a height in an axial direction and a sealing surface oriented toward a sliding surface; wherein the sealing surface consists of a diverging section that diverges from the sliding surface over a first part of the height and a contact section that extends substantially cylindrically over a second part of the height and is in contact with the sliding surface; wherein the sealing surface is arranged such that the diverging section is at a high pressure side of the sealing ring and the contact section is at a low pressure of the sealing ring; wherein the sealing ring has a ring gap with a compensatory clearance; wherein the diverging section diverges conically in a radial direction by a maximum distance; and wherein the compensatory clearance has a width equal to the product of twice the value of $\pi$ times the maximum distance.

2. A sealing ring in accordance with claim 1 wherein the diverging section diverges conically from the sliding surface.

3. A sealing ring in accordance with claim 1 wherein a plurality of webs is arranged to be distributed along the sealing surface in the peripheral direction.

4. A sealing ring in accordance with claim 1 wherein the sealing ring comprises a sealing part and a closure part, and wherein the sealing part is manufactured of one of either a plastic or a modified high-temperature polymer.

5. A sealing ring in accordance with claim 4, wherein the sealing part is manufactured of polytetrafluoroethylene (i.e., PTFE).

6. A sealing ring in accordance with claim 4, wherein the sealing part is manufactured of one of a group of materials consisting of poly (ether ether ketone) (i.e., PEEK), poly (ether ketone) (i.e., PEK), polyimide (i.e., PI), poly (phenylene sulphide) (i.e., PPS), polybenzimidazole (i.e., PBI), and polymideimide (i.e., PAI).

7. A sealing ring in accordance with claim 1 wherein the sealing ring comprises a sealing part and a closure part; and wherein the sealing part has a parting joint and a radial wall thickness decreasing towards the parting joint.

8. A packing for sealing a dry running piston rod with at least one dry running sealing ring manufactured from a non-metallic material, wherein each of the at least one sealing ring has a circular cross section, a height in an axial direction, and a sealing surface oriented toward a sliding surface; wherein the sealing surface consists of a diverging section that diverges from the sliding surface over a first part of the height and a contact section that extends substantially cylindrically over a second part of the height and is in contact with the sliding surface; wherein the sealing surface is arranged so that the diverging section is at a high pressure side of the sealing ring and the contact section is at a low pressure side of the sealing ring; wherein the sealing ring has a ring gap with a compensatory clearance; wherein the diverging section diverges conically in a radial direction by a maximum distance; and wherein the compensatory clearance has a width equal to the product of twice the value of $\pi$ times the maximum distance.

9. A piston compressor with at least one dry running sealing ring manufactured from a non-metallic material, wherein each of the at least one sealing ring has a circular cross section, a height in an axial direction, and a sealing surface oriented toward a sliding surface; wherein the sealing surface consists of a diverging section that diverges from the sliding surface over a first part of the height and a contact section that extends substantially cylindrically over a second part of the height and is in contact with the sliding surface; wherein the sealing surface is arranged so that the diverging section is at a high pressure side of the sealing ring and the contact section is at a low pressure side of the sealing ring; wherein the sealing ring has a ring gap with a compensatory clearance; wherein the diverging section diverges conically in a radial direction by a maximum distance; and wherein the compensatory clearance has a width equal to the product of twice the value of $\pi$ times the maximum distance.

* * * * *